United States Patent [19]
Graefe et al.

[11] Patent Number: 6,122,644
[45] Date of Patent: Sep. 19, 2000

[54] SYSTEM FOR HALLOWEEN PROTECTION IN A DATABASE SYSTEM

[75] Inventors: Goetz Graefe, Bellevue; Rodger Nickels Kline, Woodinville, both of Wash.

[73] Assignee: Microsoft Corporation, Redmond, Wash.

[21] Appl. No.: 09/108,291

[22] Filed: Jul. 1, 1998

[51] Int. Cl.[7] ...................................................... G06F 12/00

[52] U.S. Cl. .............................. 707/202; 707/2; 707/200; 707/201; 707/203; 707/204; 707/205

[58] Field of Search ..................................... 707/200, 201, 707/202, 203, 204, 205, 2

[56] References Cited

U.S. PATENT DOCUMENTS 6,009,425  12/1999  Mohan ......................................... 707/8

OTHER PUBLICATIONS

The Microsoft Relational Engine by Goetz Graefe, Microsoft Corporation, IEEE, pp. 1–2, Jan. 1996.

KAOS: An object–oriented software tool for the objects definition, updating, querying and programming in an object-oriented environment by Jose H. Canos, et al.; IEEE, pp. 1–4, Jan. 1996.

Graefe, Goetz, "Query Evaluation Techniques for Large Databases," ACM Computing Surveys, vol. 25, No. 2, Jun. 1993. pp. 73–170.

*Primary Examiner*—Thomas G. Black
*Assistant Examiner*—Diane D. Mizrahi
*Attorney, Agent, or Firm*—Woodcock Washburn Kurtz Mackiewicz & Norris LLP

[57] ABSTRACT

A method for preventing Halloween problem conflicts when updating records in a database system is disclosed. According to the method, in response to an update query, possible update plans are generated, and the most efficient one of the possible update plans is selected. Records in the database are thereafter processed in accordance with the selected update plan such that the records are free from Halloween problem conflicts.

54 Claims, 7 Drawing Sheets

FIG. 2

| Salary (201) | EmployeeID (202) |
|---|---|
| 54,500 | 23456 |
| 57,000 | 34234 |
| 60,000 | 87364 |
| 61,500 | 12345 |

(203, 204, 205, 206 → rows; 200 → table)

FIG. 3

| Salary (201) | EmployeeID (202) |
|---|---|
| 57,000 | 34234 |
| 59,950 | 23456 |
| 60,000 | 87364 |
| 61,500 | 12345 |

(204, 301, 205, 206 → rows; 200 → table)

FIG. 4

| Salary (201) | EmployeeID (202) |
|---|---|
| 59,950 | 23456 |
| 60,000 | 87364 |
| 61,500 | 12345 |
| 62,700 | 34234 |

(301, 205, 206, 401 → rows; 200 → table)

SYSTEM FOR HALLOWEEN PROTECTION IN A DATABASE SYSTEM

FIELD OF THE INVENTION

The present invention relates to the field of computer software and database systems. More particularly the present invention relates to a system for preventing the Halloween problem in database update operations.

STATEMENT OF THE PROBLEM

A database is a collection of related data. Data in the database are commonly organized in a two-dimensional row and column form called a table. A database typically includes multiple tables and multiple associative structures. A table is an object in the database containing zero or more records and at least one field within each record. A record is a row in the table that is identified by a unique numeric called a record identifier. A field is a subdivision of a record to the extent that a column of data in the table represents the same field for each record in the table. An example of an associative structure in a database is an index, typically, but not necessarily, a form of B-tree or hash index. Associative structures are transparent to users of a database but are important to efficient operation and control of the database management system. A database management system is a control system that supports database features including, but not limited to, storing data on a memory medium, retrieving data from the memory medium and updating data on the memory medium.

A query is used to access or update data in a database. The query is typically constructed in a variant of Structured Query Language (SQL) that may or may not be compliant with the American National Standards Institute (ANSI) standard SQL definition. A SQL query is non-procedural in that it specifies the objective or desired result of the query in a language meaningful to a user but does not define the steps or procedure by which the query should be accomplished. When a SQL query is applied to a database, the query optimizer of the database management system processes the non-procedural query to create a update plan. An update plan is procedural in that it determines the order and type of operations or operators to be performed to carry out the objectives of the SQL query. The combination of non-procedural update requests (SQL queries) and procedural update plans creates both the opportunity and the need for automatic planning of execution plans by the query optimizer. A query optimizer can generate a plurality of different query plans for any given SQL query and is typically configured to generate a query plan according to efficiency objectives.

An update is a common type of query executed on data in a database. An update is any operation that modifies existing rows in a database as well as insertions and deletions of rows in a database. As used herein, an update includes any database modification, including value changes (updates in the narrow sense), insertions and deletions. The semantics of update plans are prescribed by the ANSI/ISO standard for SQL languages. According to this standard, the semantics of any update statement must be the same as three separate phases of execution, with no overlap between phases. First, a read-only search of the database determines the rows to be updated, inserted or deleted as well as the new column values. Second, rows and columns are updated. Third, consistency constraints defined for the database are verified.

An update to a record in a table also includes updates to index entries in indexes and other associative structures associated with the updated table. Changes to associative structures, in fact the associative structures themselves, are typically not visible to a user since they result from the procedural execution of the update plan.

An operator using record-at-a-time pipelining fully processes, i.e., produces output, each time a record satisfying the predicate of the query is located. An operator using set-at-a-time pipelining consumes all of its input and only then is output produced from the operator. Record-at-a-time processing is typically more efficient since there is no need to collect a set of records on disk or in memory prior to producing output.

There is a particular problem in the field of database updating known as the Halloween problem. The Halloween problem has been well known since it was first noticed on Halloween day, 1975 by researchers at IBM's San Jose research laboratories. The essence of the Halloween problem is that, under certain conditions, an operator using record-at-a-time pipelining updates a record in a way that affects, and renders incorrect, other updates made during the same update plan. A typical example for the Halloween problem is the request (a SQL query) to "give all employees with salaries greater than $30,000 a 5% raise". If (i) these employees are found using an index on salaries, and (ii) index entries are scanned in increasing salary order, and (iii) the scan cannot distinguish index entries that have already been updated by this request from those that have not, and (iv) the index is updated immediately as index entries are found (record-at-a-time pipelining), then each qualifying employee will get an infinite number of raises. Thus, processing this request will not terminate. There are several known approaches to avoiding the Halloween problem. One is to require that no associative structure, e.g., no index, that must be updated as part of the update request may be used in the search for records to be updated. This approach can result in a significant degradation in performance since the indexes thus excluded ought to be searched for best performance thereby minimizing advantages available by use of the associative structures. Another known approach to avoiding the Halloween problem is to scan the index in increasing order if the update operation is a value decrease and vice versa. The correction of this approach is difficult to guarantee as it requires semantic analysis of the update expression and therefore this approach is typically not used in commercial database systems. A third approach is to use deferred updates. Deferred updates use set-at-a-time processing to split the update request into two phases referred to as the search phase and the update phase. The search phase is a read-only phase, i.e., the order or value of the records is not affected. Changes that must be made to the records are collected to a temporary table during the search phase. The changes collected to the temporary table are then made to the database during the update phase. There is, however, an overhead cost incurred by use of the temporary table.

The typical operator historically used for Halloween protection is called a spool. An eager spool operator computes all of its input before delivering any output to its consumer operator. Halloween protection is typically provided by placing an eager spool operator in the update plan on the input side of any update operator. This approach is inefficient because one would prefer to use record-at-a-time pipelining where each record is updated immediately after it is read therefore accessing each record only once. Also, the creation and use of a temporary table involves significant Input/Output (I/O) time, particularly in large update requests, where the temporary table may be too large to be held in the I/O buffer and therefore must be alternatively written to disk.

There exists a need for a more efficient approach to avoiding the Halloween problem. In particular, there exists a need for a query optimizer that is capable of interleaving record-at-a-time pipelining and set-at-a-time pipelining in order to achieve more efficient performance by permitting as many efficient update plans as possible while still maintaining the correct semantics of search and then update.

STATEMENT OF THE SOLUTION

The above-described problems and others are solved and an advance in the art is achieved by the system for Halloween protection of the present invention. The methods of the present invention provide an efficient method for preventing Halloween problem conflicts. Halloween protection is provided in the update plan by considering various other operators in addition to the eager spool operator and at locations anywhere in an update plan not just on the input side of an update operator. The Halloween protection system of the present invention provides improved update efficiency by interleaving the search and update phases to the full extent possible while still maintaining the required semantics, i.e., the search then update semantics of set-at-a-time pipelining, in the update plan. Thus record-at-a-time pipelining is used as much as possible by the query optimizer of the present invention and operators providing set-at-a-time semantics are provided, and thus are used to provide Halloween protection.

The present system for preventing Halloween problems takes advantage of operators that inherently provide the phase separation semantics of set-at-a-time pipelining. Various types of these operators are discussed below. The system of the present invention also provides efficiency gains by placing these operators appropriately within the update plan tree, not necessarily just on the input to an update operator.

Update plan operators are the procedural algorithms used to execute a non-procedural query against a database. Some update plan operators can be described as stop-and-go operators. A stop-and-go operator is an operator that enforces the phase separation semantics of set-at-a-time pipelining. Existing commercial database systems use the eager spool operator (or an equivalent implementation mechanism) which is one of the stop-and-go operators. The present invention uses additional stop-and-go operators to essentially accomplish two tasks at once. For example, a certain update query may require a full sort operation, e.g., if the update plan chosen uses merge join and one the inputs needs to be sorted. Full sort is one of the stop-and-go operators. The query optimizer of the present invention can achieve Halloween protection at less cost than existing commercial database systems by taking advantage of the fact that the output from the full sort operator is free of the Halloween problem due to phase separation. Thus, further Halloween protection does not need to be provided for the portion of the update plan below the full sort. Examples of stop-and-go operators are full sort, hash distinct and hash join (for the build input).

Another mechanism for Halloween protection utilized by the system of the present invention is flow-distinct operators. Flow-distinct operators rely on a stable (unchanging) key and essentially remember which values of the stable key have been seen before so that each record is operated on only once. The result is that each value in an input to a flow-distinct operator is operated on only once. An example of this type of operator is hash flow-distinct which uses a hash table to capture previously encountered keys, yet (differently than the usual implementation of hash distinct) passes unique input records directly to its consumers operator. As described with respect to stop-and-go operators, the query optimizer of the present invention can achieve Halloween protection at less cost than existing commercial database systems by taking advantage of the fact that the output from the flow distinct operators has, under specific circumstances described below, Halloween protection.

A further mechanism, if it is known that only one record will be changed in an input table, is top. Top passes only a fixed number of input rows to its consumer operator. For example, if it is known that only one record should change (e.g., because the update query specifies a specific value for a unique key, then once an update is made to a single record the input is considered exhausted. Although only a single record is updated, this is still in accordance with the semantics of set-at-a-time pipelining since it is known that only one record in the set is to be changed.

The system of the present invention operates as part of a database's query optimizer. In response to a query request, the query optimizer first identifies potential Halloween problem conflicts. Potential conflicts arise when an index is both searched and updated (the traditional Halloween problem).

Halloween conflicts can arise, however, in other contexts. One example is in the case of forwarded records. A forwarded record is a record that has been moved from a first memory or disk location to a different memory location for any reason, typically a change in size in an earlier update. A pointer record is left in the first memory or disk location and points to the forwarded record. The record content is in the forwarded record. In an update, the forwarded record changes whereas the pointer location (where the pointer is, not the pointer's target) doesn't change. The potential problem arises if a forwarded record moves due to the present update, and moves "ahead" in the present scan that finds records to be updated. When is a record found in this scan,—when the pointer is found, or when the record contents is found? If the former, Halloween protection is not an issue, because the pointer doesn't move with respect to the scan due to the update, i.e., the scan doesn't encounter the same record again. If the latter, the contents may move to a place where the scan will encounter the contents again—and the Halloween problem arises. For good efficiency one prefers the latter because following the pointer to a different memory page may incur an additional I/O operation. However, to avoid the Halloween problem, one prefers to process pointer records. The system of the present invention provides methods for optimizing a choice between the two approaches.

Once the potential conflicts are identified, the system of the present invention selects the least expensive mechanisms for providing Halloween protection. As noted above, these mechanisms include stop-and-go operators placed at any place in the query and update plan, TOP, and flow-distinct operators. The system of the present invention then structures the query plan and places the above-noted operators as appropriate within the query plan to ensure Halloween protection. It may be the case that no change to the plan is required to provide Halloween protection, as some of these operators may be required in the query for other purposes.

A data structure called a Halloween property is defined and used as part of the required and delivered properties system of the query optimizer to implement Halloween protection according to the present invention. The maintenance of the Halloween protection system is accomplished through implementation of the Halloween protection property in the query optimizer. Multiple types of Halloween protection are defined ranging from "no required Halloween protection" to the traditional eager spool operator as input to the update operation. Only the necessary level of Halloween protection is provided for a given plan or sub-plan. The result is that Halloween protection is provided within an optimized query plan incurring the smallest amount of anticipated execution cost, the Halloween problem in database update operations.

BRIEF DESCRIPTION OF THE DRAWINGS

FIGS. 2–4 illustrates three successive views of database table undergoing updates;

Figure 1:
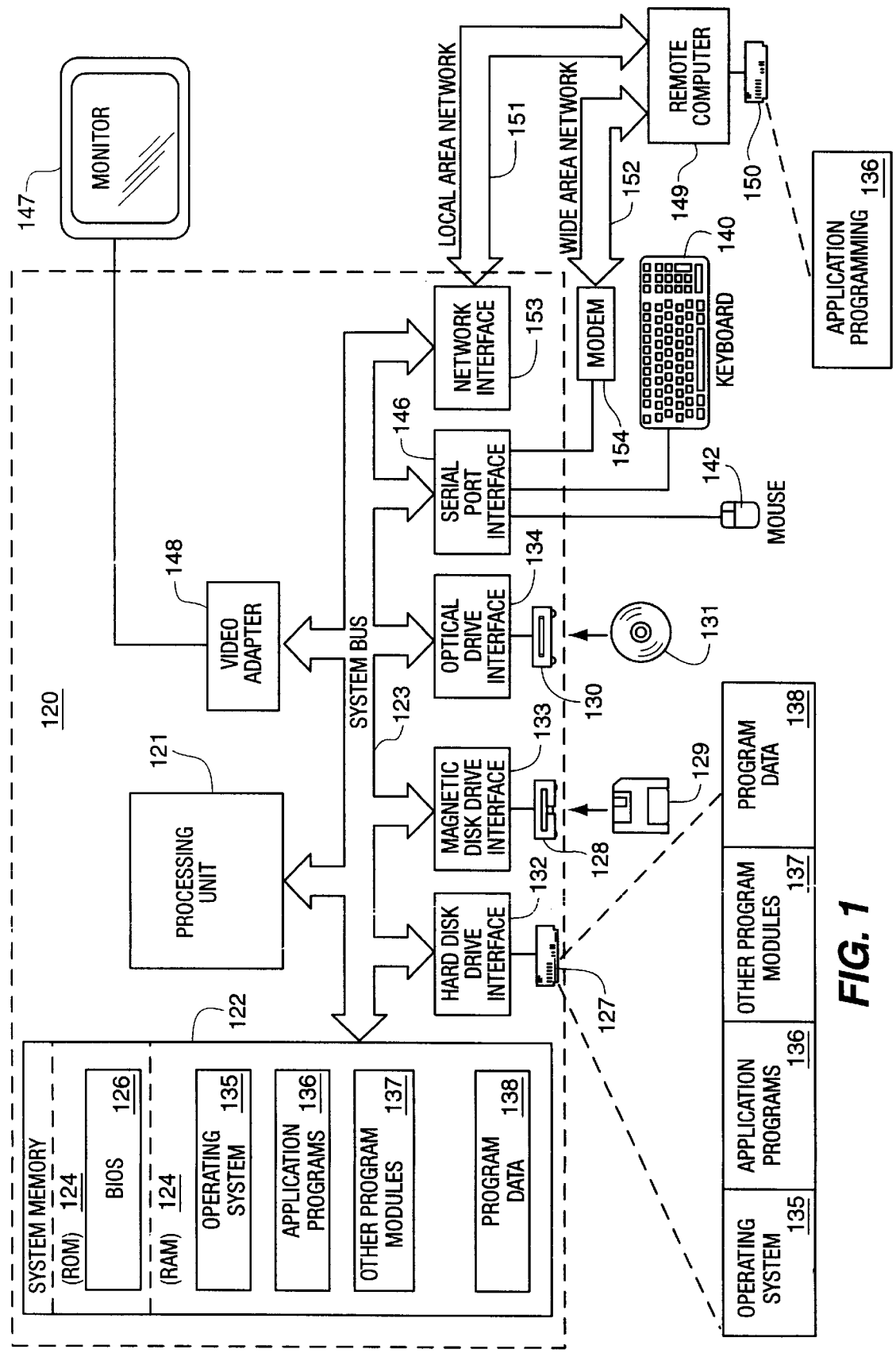
FIG. 1 is a block diagram illustrating the computing environment within which the Halloween protection system of the present invention operates.

DETAILED DESCRIPTION
Computing Environment In General—FIG. 1

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridge, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Halloween Problem Background—FIGS. 2–4

FIGS. 2–4 are used to illustrate an example of the traditional Halloween problem. Suppose a user of the database of which index table 200 is a part intends to give all employees with salaries above $50,000 a 10% salary increase. The employees matching the salary criteria are found using index 200 and the index is ordered by first salary, then employee ID. The traditional Halloween problem concerns searching and updating an index structure in a database with a single statement, query or plan such that the update affects the search. Those skilled in the art recognize that the Halloween problem is not limited to databases but can arise in any computer application where a data structure is both updated and searched. FIGS. 2–4 depict three successive stages of the same index 200. FIG. 2 depicts represents the original index 200, FIG. 3 depicts the same index 200 after the first update to a record in the table 200, and FIG. 4 depicts the same index 200 after a second update to index 200. Index 200 is, for example, part of a database (not shown) that is one of application programs 136, with reference to FIG. 1. Index 200 is an index of employee salaries by employee ID's. Index 200 is related to other tables (not shown) making up the database by column 202 (EmployeeID). With reference to FIG. 2, if records 203–206 in index 200 are scanned in increasing salary order and index 200 is updated immediately as matching index records are found, the scan cannot distinguish records that have already been updated by this request from those that have not. This is the traditional Halloween problem of an index that is both searched and updated.

The following example using FIGS. 2–4 better illustrates the problem. Beginning with the original content of index 200, as depicted by FIG. 2, the first record updated by the scan is record 203. Record 203 indicates a salary of $54,500 for the employee with employee ID 23456. Record 203 meets the update predicate (a salary in excess of $50,000) thus the salary is increased by 10% to $59,950. The index is updated each time a record is located which satisfies the update predicate. FIG. 3 depicts the same index 200 but record 203 of FIG. 2 has been updated as reflected by record 301 of FIG. 3. The updated salary for the employee having employee ID 23456 is found in record 301. After updating the first record meeting the update predicate, the system locates the next record, record 204, that satisfies the search predicate. The salary indicated by record 204 ($57,000) is thus increased by 10% to $62,700. FIG. 4 represents the same index table 200 as depicted in FIG. 3 but FIG. 4 reflects the changes made after the first two updates, as described above. Thus after the first two updates are completed the updated salary for the employee having employee ID 34234 is found in record 401. With reference to FIG. 4, the next record meeting the update predicate is record 301. Record 301 contains the salary for the employee having employee ID 23456. This is the same employee ID for which the salary was updated by the first update (record 203). Plainly, each of the records 203–206 are updated an infinite number of times by this update request. This is the essence of the traditional Halloween problem in database management systems.

Figure 5:
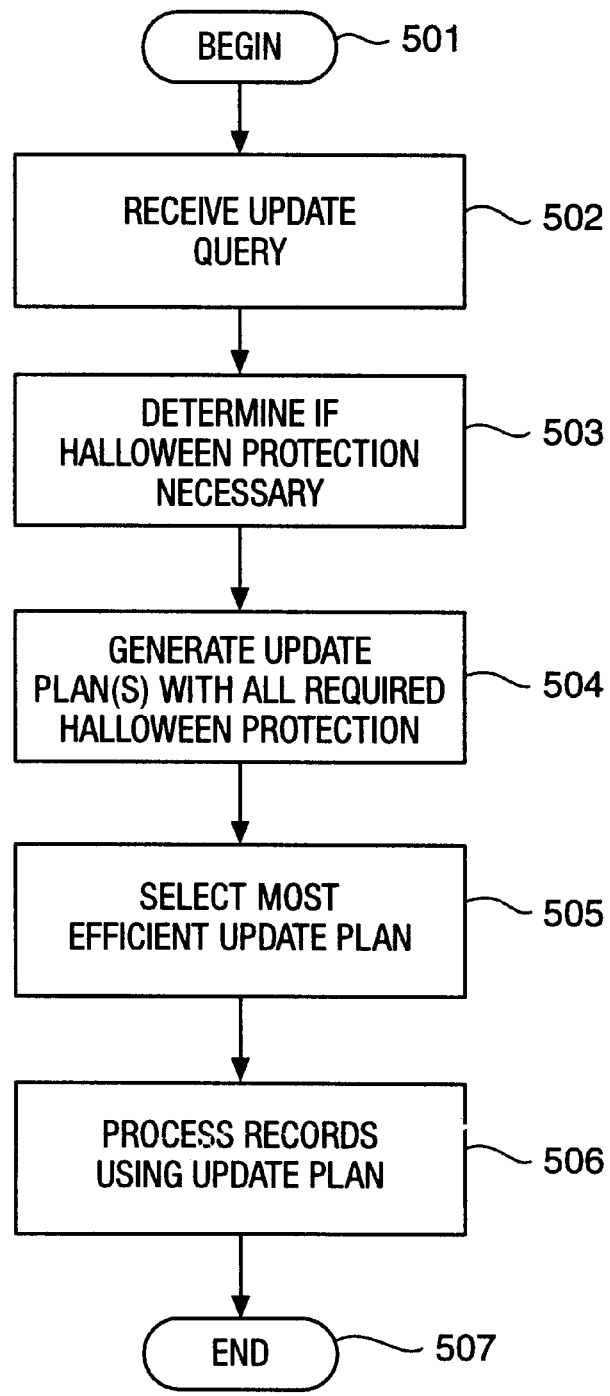
FIG. 5 is a flowchart illustrating the basic steps for implementing the system of the present invention.

System For Halloween Protection In General—FIG. 5

FIG. 5 is a flow chart illustrating the general steps implemented by the Halloween protection system of the present invention for updating records. FIG. 5 is also effectively a road-map to the more detailed topics discussed herein.

Processing steps 501–507 are implemented in a query optimizer in the case where the present invention is applied to a database management system. The query optimizer translates a non-procedural SQL query into a procedural update plan which is then executed against the records of the database. Processing begins in step 501 with, for example, the running of a database application within which is implemented the Halloween protection system of the present invention. During step 502 a SQL update query is received. Processing proceeds from step 502 to step 503.

During step 503 the system determines if Halloween protection is necessary and, if it is necessary, what level of Halloween protection is necessary. As described with respect to FIG. 6, there are multiple situations that give rise to a need for Halloween protection. As described with respect to FIGS. 9–12, the system of the present invention provides a data structure, referred to as a Halloween property, for maintaining the various levels of possible Halloween protection. Processing proceeds from step 503 to step 504.

During step 504 the system of the present invention generates one or more update plans based on the query received during step 502 and the necessity for, and level of, Halloween protection determined during step 503. As described with respect to FIG. 8, there are a number of operators which provide certain levels of Halloween protection and which can be placed anywhere in an update plan. Processing continues from step 504 to step 505.

During step 505 the most efficient update plan is selected for use. In the case where a single update plan is generated during step 504, then that single update plan is chosen during step 505. In the case where multiple update plans are generated during step 504, then the most efficient one of the possible update plans is selected during step 505, as described with respect to FIGS. 7. Processing next proceeds to step 506.

During step 506 the update plan is applied to the records and output records with Halloween protection are generated in the most efficient manner. Processing concludes with element 507 which is representative, for example, of the completion of the delivery of output records to a user.

Figure 6:
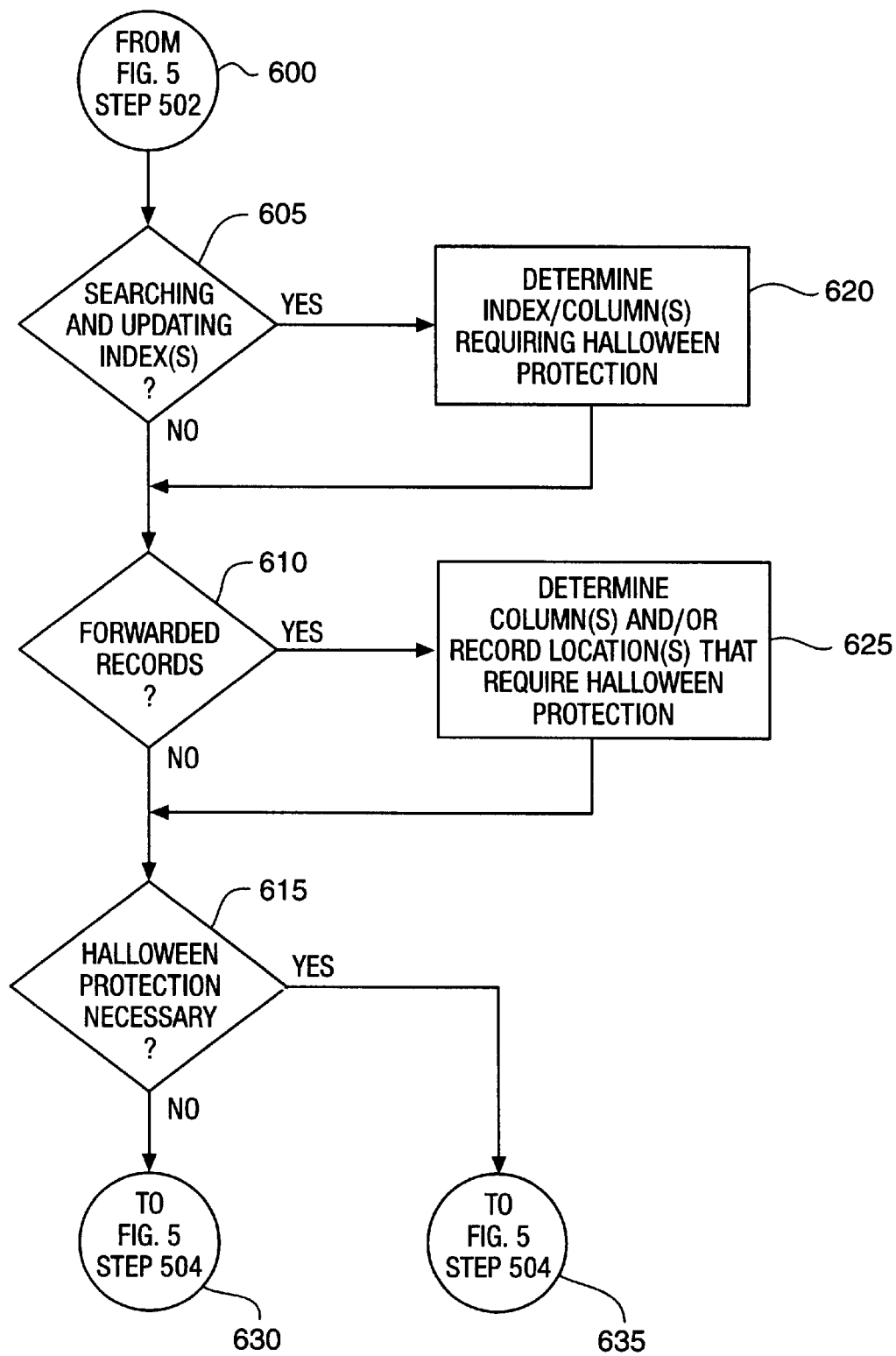
FIG. 6 is a flowchart illustrating the steps for determining if Halloween protection is necessary.

Determining the Necessity of Halloween Protection—FIG. 6

The traditional situation giving rise to the Halloween problem is described above with respect to FIGS. 2–4. In general terms this situation is where an index is both searched and updated. There are other situations, however, which give rise to the need for Halloween protection. The various situations giving rise to the Halloween problem are discussed with respect to FIG. 6. FIG. 6 is a flow chart depicting more detailed steps for executing step 503 of FIG. 5. Steps 600–635 operate to determine if any level of Halloween protection is necessary for a given query.

The flow chart of FIG. 6 begins with element 600 to which processing flows from step 502 of FIG. 5 and from which processing flows to decision block 605.

Decision blocks 605–615 determine whether the present query, received during step 502, gives rise to one of the situations for which Halloween protection is necessary.

Decision block 605 operates to determine whether the traditional Halloween problem situation (an index that is both searched and updated) exists. If so, then processing continues to step 620 otherwise processing passes to step 610. During step 620, some of the information necessary for generating the Halloween property data structure, discussed in more detail with respect to FIGS. 9–12, is determined including the table(s) and column(s) requiring Halloween protection. When Halloween protection is required for a table, any aliases of that table also require Halloween protection. This information is used to generate the necessary Halloween properties. Processing continues from step 620 to decision block 610.

Decision block 610 operates to determine if Halloween protection is necessary due to the present query involving forwarded records. If so, then processing continues to step 625 otherwise processing passes to step 615. The issue of Halloween protection with respect to forwarded records involves the formatting of the physical memory on which the database records are stored. Pages in memory are a fixed size while fields in database records can be of variable length. When a record is lengthened, for example, due to an update, the record may no longer fit on the original page. This is sometimes referred to as a record "spilling off" the page. When this occurs, the updated record is moved to a new page and a pointer is left behind at the original page. The pointer record points to the forwarded record. The updated, forwarded record might be encountered again during the same update operation since the forwarded record has been moved to a new page. This is the Halloween problem with respect to forwarded records. During step 625, some of the information necessary for generating the Halloween property data structure is determined and/or recorded, including the table(s), column(s), and/or record location(s) requiring Halloween protection. This information will be used, as described below, to generate the necessary Halloween properties. Processing proceeds from step 615 to element 630 and step 504 of FIG. 5.

Decision block 615 operates to determine if Halloween protection is required for any tables and at any level in order to complete the present query. If processing has continued through decision blocks 605–610 with no tables, columns, and/or records being identified as needing Halloween protection, then no Halloween protection is necessary and processing continues at element 630 by returning to step 504 of FIG. 5 where update plans are generated without concern for providing Halloween protection. However, if it is determined at decision block 615 that there exists at at least one index or column identified by operation of steps 605–610 as needing Halloween protection, then processing proceeds from step 615 to element 635 by returning to step 504 of FIG. 5 where update plans are generated with the required Halloween protection in mind.

Those skilled in the art of database management systems recognize that FIG. 6 illustrates an exemplary implementation and that the steps therein may be carried out in a different order or even interleaved with other steps not shown in FIG. 6.

Figure 7:
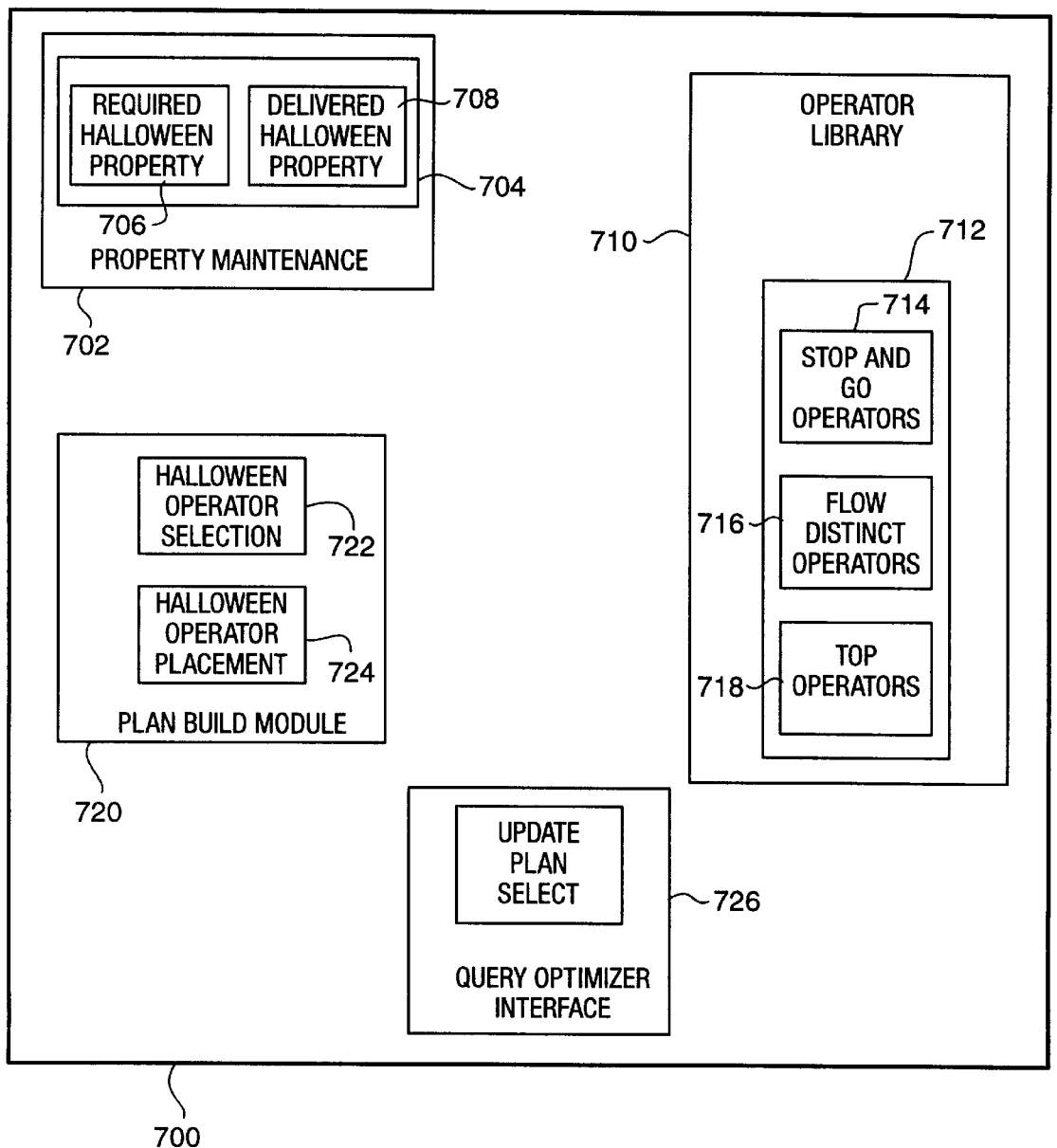
FIG. 7 depicts a block diagram of modules representing a query optimizer implementing the system of the present invention.

Generation of Update Plan—FIG. 7

The foundation for the generation of update plans according to the present invention are the query optimization techniques known to those skilled in the field of database management systems. In addition, the present invention makes available operators previously unused for Halloween protection and provides methods for using these operators anywhere in the update plan rather than simply at the input to an update operator. The present invention also adds the Halloween property data structure to the existing system of required and delivered properties as a means of representing the Halloween protection provided by the system of the present invention. The query optimizer makes use of the additional Halloween protection operators, the flexible Halloween operator placement options and the Halloween property to generate an efficient update plan.

FIG. 7 illustrates a generic block diagram of a query optimizer 700, which includes modules according to the teaching of the present invention. Query optimizer 700 includes property maintenance module 702 for maintaining a system of required and delivered properties. Query optimizer 700 includes operator library module 710 which contains a collection of algorithms or operators for use in update plans. Query optimizer 700 also includes a plan build module 720 for building update plans. Modules 702, 710 and 720 all operate together to produce an update plan which is applied to a database system (not shown) through query optimizer interface 726. The query optimizer 700 described in general by modules 702, 710, and 720 operates in a manner known to those skilled in the art. The teaching of the present invention overlays additional modules and methods on existing query optimizer operation in order to produce more efficient Halloween protection.

Operator library module 710 includes Halloween operators 712. Halloween operators 712 includes stop-and-go type operators 714, flow distinct type operators 716 and top operators 718. Stop-and-go type operators 714 can include, but are not limited to, spool, hash aggs., hash joins, and sort. The Halloween operators, and their placement, are discussed in more detail with respect to FIG. 8. Plan build module 720 includes Halloween operator selection module 722 and Halloween operator placement module 724. Selection and placement of Halloween operators is discussed in more detail with respect to FIG. 8. Property maintenance module 702 includes Halloween property module 704 which in turn includes required Halloween property module 706 and delivered Halloween property module 708. The Halloween property data structure is discussed in more detail with respect to FIGS. 9–12.

Query optimizer interface 726 also includes update plan selection module 730. In one mode of operation, the system of the present invention produces multiple, possible update plans all of which satisfy the SQL update query and all of which ensure Halloween protection. The variety of Halloween operators and the flexible Halloween operator placement options allow for multiple update plans to be produced. The update plan selection module operates to the select the most efficient plan of those produced by plan build module 720. The selected, and therefore most efficient, update plan is applied by query optimizer interface 726 to the database system.

Figure 8:
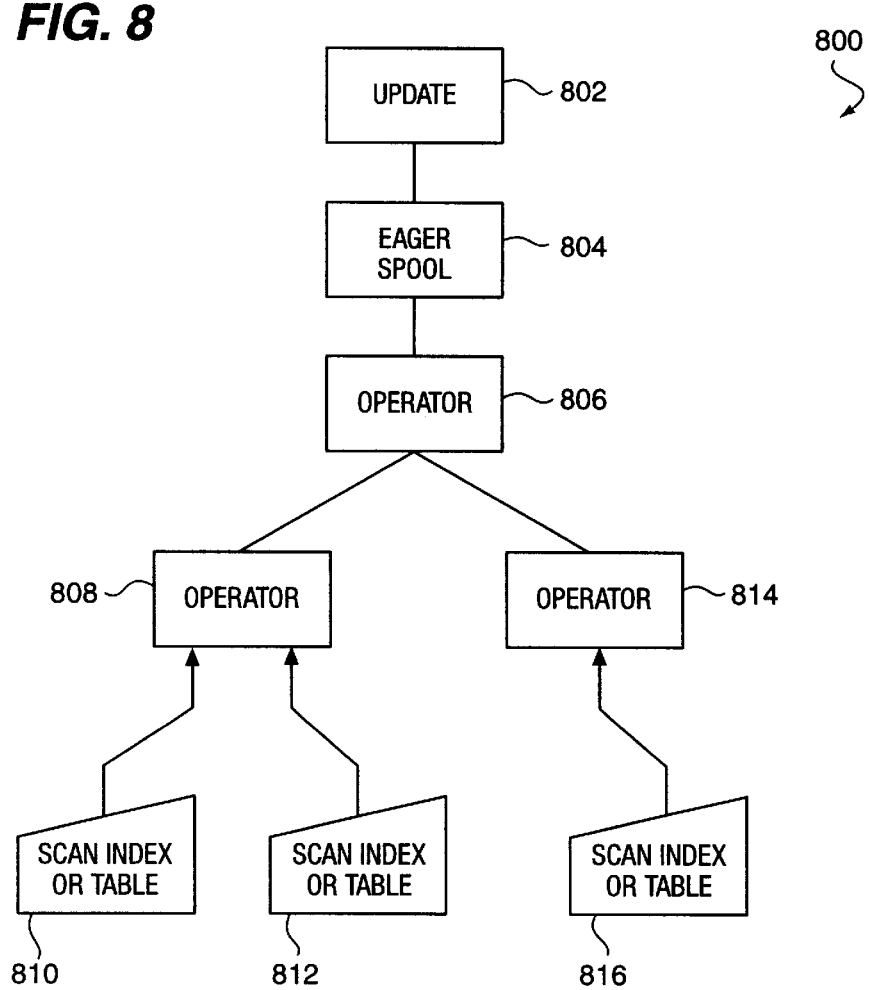
FIG. 8 depicts an exemplary update plan tree.

Halloween Protection Operators—FIG. 8

Stop-and-Go Operators

The traditional approach for providing Halloween protection has been to use a spool operator to achieve the semantics of separate search and update phases. A spool operator saves all input items in a work file and then produces them from the work file. In eager spool, all input records are computed and saved before the first output item is delivered to the consumer of output from the eager spool operator. Historically, the eager spool operator is placed on the input to the update operator in the update plan therefore enforcing phase separation over the entire update plan.

The eager spool operator is referred to herein as a stop-and-go operator since it enforces the semantics of separate search and update phases. The present invention utilizes stop-and-go operators, eager spool and others, for providing Halloween protection. Additional stop-and-go operators include full sort, hash distinct and hash join (for the build input only). The characteristic that all the stop-and-go operators have in common is that they all consume the entirety of their input before producing any output.

FIG. 8 illustrates an update plan tree 800 where eager spool operator 804 provides input to update operator 802.

FIG. 8 is described to provide a simple example of utilization by the present invention of stop-and-go operators to provide Halloween protection. Update plan tree 800 may be a sub-plan of a larger query plan (not shown). An update plan defines the procedural order of execution to satisfy a SQL query. Historically, to ensure that update operator 802 produced records free of Halloween problems, eager spool 804 was inserted in update plan 800 on the input to update operator 802. As noted above, an eager spool operator saves all input items in a work file and then produces them one record-at-a-time from the work file. With reference to FIG. 8, all input to eager spool operator 804 is computed and saved to a work file before the first record is produced as input to update operator 802. All operations below update operator 802 (the search phase) occur prior to any record being input to update operator 801. In other words, spool operator 804 collects each record that is to be updated by the current update query. The Halloween problem cannot occur because when the update phase begins the search phase has already completed.

According to the present invention, eager spool operator 804 is available as a means of Halloween protection but it is not the only tool for achieving Halloween protection. The eager spool operator is just one of the stop-and-go operators that provide the necessary phase separation for Halloween protection. Another stop-and-go operator is full-sort. With reference to FIG. 8, if operator 814 is a full-sort operator then records output from operator 814 to operator 806 have Halloween protection. A full sort operator consumes all input records and then produces them in order. There is no need to take further steps to ensure Halloween protection for records output from operator 814 where operator 814 is a full sort operator. Thus, eager spool operator 804 is unnecessary and therefore inefficient with respect to records output from the full sort operator of operator 814. However, one must still consider whether eager spool operator 804 is necessary for records output from operator 808 as its output may or may not require Halloween protection.

Another stop-and-go operator is eager hash distinct. A hash distinct operator collects all unique input items in a hash table, and then produces output. Hash distinct, like eager spool and full sort, uses record-at-a-time processing but enforces the necessary semantics of phase separation. Another stop-and-go operator is hash join. A hash join operator, for a relational join on an equality predicate, consumes its entire build input while constructing a hash table. Then the probe input is consumed one record at a time and output is produced one record at a time. Thus, hash join provides Halloween protection for the build input but not for the probe input since the necessary semantics are enforced only on the build input.

Stop-and-go operators are used by the query optimizer of the present invention to provide Halloween protection. The query optimizer might select the traditional approach of an eager spool operator at the 'top' of the update plan, as illustrated by operator 804 of FIG. 8. Alternatively, the query optimizer might choose to utilize stop-and-go operators placed elsewhere in the update plan. Thus, referring to the conventional update plan 800, any or all of operators 806, 808 or 814 could be stop-and-go operators and, depending on the update query, eager spool 804 may not be necessary at all. Operators that are necessary to execute the update query anyway are used to also provide Halloween protection. The query optimizer therefore has more options available for constructing more efficient update plans.

A further mechanism used by the query optimizer of the present invention for providing Halloween protection is the top operator. Top limits the number records passed to the update operator. This is useful if the query optimizer knows there will be at most one record changed by operation of this update. Consider the example of an Automated Teller Machine (ATM) where a user withdraws $20 in cash from the ATM. The ATM computer searches its records for the unique account number to update the record to reflect the $20 withdrawal. It is known that only one account, i.e. one record, is to be updated thus when the proper record is located and updated no further records are searched or updated. With reference again to FIG. 8, operator 806 might be a top operator while the operations below operator 806 operate to search through multiple accounts, e.g. a checking account and a savings account, to find the one record to be updated. Once the one record is updated, no further records are passed to the update operator. The top operator is a further tool available to the query optimizer of the present invention for construction of efficient update plans.

Flow Distinct Operators

Another mechanism employed by the system of the present invention to solve the Halloween problem is to ensure uniqueness of the items to be updated. For example, if an index on salaries produces record ID's and a duplicate removal step on record ID's ensures that no record ID is passed to the update operator twice, the Halloween problem is avoided, even if the duplicate removal step is not a stop-and-go operator. An example for such a "flow distinct" operation is a hash-based duplicate removal operator that retains each unique input item in its hash table and also passes it through immediately. Another flow distinct operator is major-minor sort. Major-minor sort sorts on additional columns ("minor columns") of an input already sorted on some columns ("major columns"). A major-minor sort consumes its input and produces output in segments and is therefore not a stop-and-go operator. A major-minor sort operator may, however, be configured to remove duplicates within each segment, and therefore within the entire input set of records. Thus it has the essential effect of a stop-and-go operator in that it prevents passing the same record twice, in this case by preventing duplicate records from being produced. Just as with the stop-and-go operators and top operator, it is desirable to place duplicate removal operators within an update plan tree to reduce resource requirements, e.g., CPU, I/O, and memory. The flow distinct operators can be used for Halloween protection when they rely on a stable key that is not affected by the update operation.

Following the discussion of the Halloween property with respect to FIGS. 9–12, a sample listing of operators is provided that describes both the execution effect of the operator as well as the required and delivered properties associated with each operator.

Halloween Protection Property—FIGS. 9–12

There are, as noted with respect to FIGS. 2–8, a variety of situations and conditions giving rise to the possibility of the Halloween problem. There are also, as noted with respect to FIG. 8, a variety of operators used by the system of the present invention for providing Halloween protection. There is also, as noted with respect to FIG. 8, a great deal of flexibility available to the query optimizer of the present invention in the placement of Halloween protection operators in an update plan. A data structure is now defined that captures a Halloween property that can be required of and delivered by an update plan or sub-plan. The maintenance of the Halloween property in the query optimizer up and down an update plan is also described.

Intermediate query results are described by their properties. An intermediate query result can be output from a single operator within a query plan or from a sub-plan of an over-all query plan. Properties describe an intermediate result, not the computation that produces the intermediate result. Properties may be divided into group and plan properties. The definition and use of properties to describe intermediate query results is well-known to those skilled in the relevant art. The present invention provides an additional property, called the Halloween property, which defines the Halloween protection aspects of either a required input to an operator or a delivered output from an operator. These are referred to as required and delivered Halloween properties, respectively.

In order to determine whether a sub-plan is a suitable input for an algorithm (operator), each operator determines what plan properties it requires from its inputs, e.g., sort order for merge join, and which plan properties it delivers, e.g., sort order from a B-tree scan. These plan properties are called the required and delivered plan properties. Often, an operator's delivered properties depend on its input's delivered properties, e.g., only if the input to a filter is sorted will the output of the filter be sorted. Thus, one cannot describe an operator's delivered properties; instead, one must think in terms of a mapping, i.e., how an operator maps its input's delivered properties to its own delivered properties. Similarly, many operators can deliver quite complex required properties simply by passing the requirement on to their own inputs.

Execution operators produce their output via an iterator interface with methods to open, next, close, rewind and rebind. If a query plan contains nested loops operations with correlations, i.e., the inner input plan is run repeatedly with different outer correlation values, we say the inner plan is rebound with multiple values. If a file or index is read repeatedly, correct update semantics require that the scan produce the same results each time. Therefore, if the inner input plan reads from the updated table or one or more of that table's indexes are affected by the change then Halloween protection is required. Rewinding produces the same result set. Most iterators rewind by rewinding their input iterators. All iterators can also be rebound with new parameters, which always implies rewinding. For a sub-plan without unbound parameters, rebinding is equivalent to rewinding. In all other cases, rebinding an iterator implies rebinding and rewinding the iterator's inputs.

The required Halloween property consists of several parts. The first part indicates the table and the columns for which Halloween protection is required. A second part of the required Halloween property indicates the level at which Halloween protection is required. There are four levels of Halloween protection discussed herein and described below. A third part of the required Halloween property is a rewind flag. The rewind flag may be part of the Halloween property or it may be part of the existing plan properties for a given query optimizer. Since rewinding depends on the implementation algorithms (operations) chosen further up in the query plan, the rewind flag is a necessary property used to indicate that rewinding may occur.

The data structure of the delivered Halloween property is the same as the required Halloween property. The former indicates the tables and columns for which Halloween protection is not guaranteed by the plan, i.e., for which Halloween protection is required if the table were to be updated further up in the plan. The latter part of the delivered Halloween property indicates the level of Halloween protection required if the table were to be updated further up in the plan. The final part of the delivered Halloween property is the rewind flag which, if present in the delivered Halloween property, indicates that the plan does not deliver Halloween protection if rewound.

Figure 9:
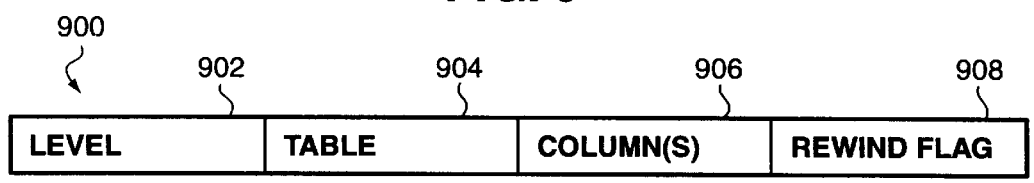
FIG. 9 depicts the general format of a data structure according to the present invention.

FIG. 9 illustrates the format of the Halloween property data structure. Data structure 900 includes data fields 902–908. Data structure 900 is the same for the case of a delivered Halloween property and a required Halloween property. However, the meaning of the various data fields varies depending on whether it is a delivered or required property. For example, the sort property indicates the sort order that is indeed delivered, whereas the delivered Halloween property indicates the protection that the plan doesn't deliver and therefore is still required.

Data field 902 indicates the level of required or delivered Halloween protection. The various levels of Halloween protection are discussed below. Where data structure 900 represents a required Halloween property, data field 904 indicates the tables, if any, having columns for which Halloween protection is required. Where data structure 900 represents a delivered Halloween property, data field 904 indicates the table(s) that having columns that do not have Halloween protection.

Data field 906 indicates the column(s) of the tables indicated in data field 904 for which Halloween protection is required (where data structure 900 is a required Halloween property) or for which Halloween protection is not provided (where data structure 900 is a delivered Halloween property).

Data field 908 is the rewind flag. The rewind flag data field is included in data structure 900, as shown in FIG. 9. The rewind flag is set if the plan may not be rewound without losing Halloween protection.

There are four levels of Halloween protection defined herein. Level 1 means no Halloween protection is required. This could mean, for example, that there is no update further up in the update plan, or because there are no unbound parameters passed through an eager spool. Level 2 Halloween protection means that Halloween protection is required for all aliases of the updated table except for the source of some stable key. Level 3 Halloween protection means that Halloween protection is required, except for the source of a dedicated stable key, for which uniqueness is required. Level 4 means that full Halloween protection is required by, for example, an eager spool operator below an update operator. This is the traditional approach to solving the Halloween protection problem. The hierarchy among the four levels, in order of increasing need of Halloween protection, is Level 1, Level 2, Level 3 and Level 4.

As previously noted, the data structure for delivered Halloween protection is the same as the one for required Halloween protection. A plan may indicate that absolutely no Halloween protection is required (level 1) or may indicate a table and some columns for which Halloween protection has already been provided unless the plan is rewound (level 3, rewind flag is on, table and column names are required). To represent correctly the delivered properties of binary operation such as joins, the delivered Halloween protection property is actually an array of Halloween protection structures.

Figure 10:
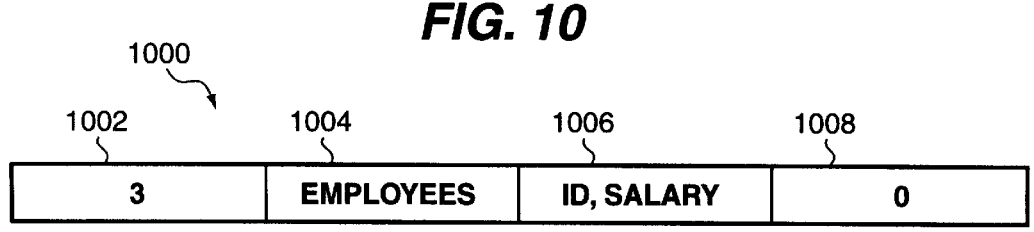
FIG. 10 depicts an exemplary data structure according to the present invention.

FIG. 10 depicts an exemplary data structure 1000 which is a required Halloween property. Data field 1002 indicates a required level 3 of Halloween protection. Data field 1004 identifies a table named 'EMPLOYEES' and data field 1006 identifies two columns of the EMPLOYEES table, 'ID' and 'SALARY'. This is the table and columns for which Halloween protection is required. The rewind flag, data field 1008, is not set, therefore the plan may be rewound without losing Halloween protection.

Figure 11:
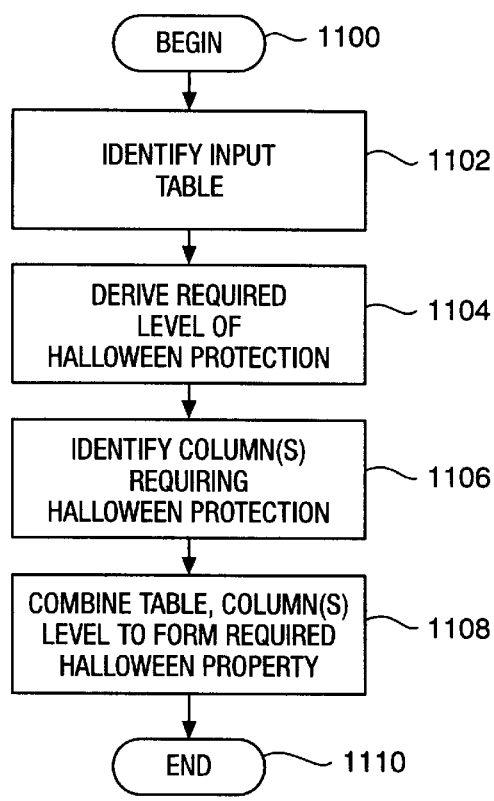
FIG. 11 is a flowchart illustrating the steps for deriving the required Halloween property.

FIG. 11 is a flow chart illustrating the processing steps executed by the system of the present invention to build the required Halloween property data structure. Processing begins with element 1100 each time an operator is selected for use, or possible use, in an update plan. During step 1102, a table to be input to the selected operator is identified. Processing proceeds to step 1104.

During step 1104 it is determined what level of Halloween protection is required for the selected table and, during step 1106, the column(s) requiring protection are identified. Processing next proceeds to step 1108.

During step 1108 the table identifier, the column(s) identifier(s) and the Halloween protection level are combined to form the required Halloween property data structure. Processing then concludes with element 1110.

Figure 12:
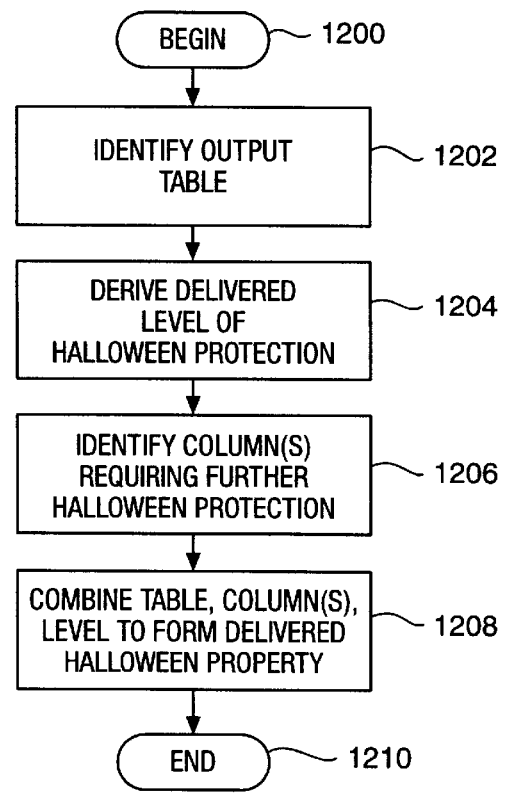
FIG. 12 is a flowchart illustrating the steps for deriving the delivered Halloween property.

FIG. 12 is a flow chart illustrating the processing steps executed by the system of the present invention to build the delivered Halloween property data structure. Processing begins with element 1200 each time an operator is selected for use, or possible use, in an update plan. During step 1202, a table from which records are to be output from the selected operator is identified. Processing proceeds to step 1204.

During step 1204 it is determined what level of Halloween protection is still required for the selected table and, during step 1206, the column(s) still requiring protection after processing by the selected operator are identified. Processing next proceeds to step 1208.

During step 1208 the table identifier, the column(s) identifier(s) and the Halloween protection level are combined to form the delivered Halloween property data structure. Processing then concludes with element 1210.

Sample Operators and Required/Delivered Properties

Update: Modifies existing rows in a table, i.e., records and index entries in all affected indexes associated with the updated table are altered. Since there is no output, there are no delivered properties to derive. The input's required properties are uniqueness of a stable key for the updated alias, if such a key exists, and full Halloween protection for all aliases of the updated database table's updated columns (levels 3 or 4). Rewind (or rebind) operations do not apply to an update operator or its immediate input (rewind flag is off).

Insert & delete: Inserts or deletes rows in a table, i.e., records and index entries in all indexes associated with the affected table. Since there is no output, there are no delivered properties to derive. The input's required properties are full Halloween protection for all columns of the updated database table (level 4). Rewind (or rebind) operations do not apply to this operator or its immediate input (rewind flag is off).

Scan: Retrieves records or index entries from a heap file or B-tree. Offers two modes, one in which records or index entries are found in the order of record ID's or ordering keys ('ordered scans'), and one in which records and entries are found in seemingly random order ('random scans'). In random scans, the sequence in which records are produced may be affected by the records' true locations even for records forwarded during updates that increased the records' sizes, or driven by the performance of multiple disk arms. Since there are no inputs, there are no required properties to derive. The output's delivered properties indicate no protection if the scan may be rewound (rewind flag is on). For an ordered scan, the ordering columns require Halloween protection via uniqueness (level 3). For a random scan, all columns require Halloween protection (level 4).

Spool: Saves all input items in a work file, and then produces them from the work file. Supports rewinding locally using the work file. In eager spool, all input items are computed and saved before the first output item is delivered to the consumer iterator; in lazy spool, input items are computed and saved only as requested by the consumer iterator. The output's delivered properties are full Halloween protection for eager spool (level 4, rewind flag is off). The lazy spool iterator passes its input's delivered properties through after removing the requirement for rewind protection if there is one (rewind flag is off). The input's required properties are none for eager (level 1, rewind flag is off). The lazy spool operator passes its required properties through to its input, except that it does not require rewind protection (rewind flag is off). No Halloween protection is provided if there exist unbound parameters under the spool.

Filter: Applies a predicate, which may use a parameter. If the parameter is not used in the filter's input plan, rebinding a filter translates to rewinding its input. Filter rewinds by rewinding its input. The filter operator passes required and delivered properties through.

Full sort: Consumes all input items, and produces them in order. May remove duplicates. Rewinds by restarting only the last merge step (called 'sort with local rewinding') or by rewinding the input plan and restarting the entire sort ('sort without local rewinding'). If local rewinding is supported, full sort is exactly like eager spool with respect to Halloween protection properties. Otherwise, it is like eager spool except under rewind, for which case full sort does not provide any Halloween protection, i.e., it passes the required rewind flag through to its input, and its input's delivered rewind flag to its output.

Major-minor sort: Sorts on minor columns an input already sorted on major columns. Consumes its input and produces its output in segments. In other words, this is not a stop-and-go operator. May remove duplicates within each segment, and therefore in the entire input stream. Rewinds by rewinding its input and restarting the sort. If the major sort columns are not updated, major-minor sort is like full sort without local rewinding. Otherwise, major-minor sort does not provide phase separation, i.e., full Halloween protection. If major-minor sort implements flow-distinct based on a stable key, the output's delivered properties are like the input's delivered properties, except it raises level 3 to 2, i.e., it delivers level 2 if the input delivers level 3, and it requires level 3 for its input if level 2 is required for its output.

Stream distinct: Removes duplicates presuming an input sorted on all columns. Rewinds by rewinding its input. Required and delivered Halloween properties are derived like major-minor sort with duplicate removal and updates among the major sort columns.

Hash distinct: Collects all unique input items in a hash table, and then produces output. Rewinds by rewinding its input and restarting the hash distinct. Required and delivered Halloween properties are derived like full sort without local rewinding. Hash distinct is also known as eager hash.

Hash flow-distinct: Like hash distinct, but produces an output item each time an input item was not found and therefore inserted in the hash table. Rewinds by rewinding its input and restarting. If rewinding is required, hash flow-distinct does not contribute to Halloween protection, and passes delivered and required properties straight through. Otherwise, presuming there is a stable key to hash and compare on, hash flow-distinct raises level 3 to 2, similar to major-minor sort implementing flow-distinct. Hash flow-distinct is also known as non-eager hash.

Merge join: The well-known algorithm for relational join on an equality predicate. Rewinds by rewinding both inputs and restarting. The output's delivered properties are the union of the input's delivered properties. For the inputs' required properties, the uniqueness requirement (levels 3 and 4) can be passed to the input(s) that binds the stable key, whereas the other input requires full Halloween protection (level 2).

Hash join: For relational join on an equality predicate, consumes its build input and constructs a hash table, then consumes its probe input and produces output. Rewinds by rewinding both inputs and restarting. Required and delivered Halloween properties are derived like merge join.

Cartesian product: Using nested loops, rewinds its 'inner' input once for each item in the 'outer' input, or for each group of items. Rewinds by rewinding its outer input. The delivered properties are the combination of the outer input's delivered properties and the inner input's delivered properties under rewind. If the inner input's rewind flag is on, the Cartesian product's output must require full Halloween protection (level 2) for the tables and columns named by the inner input. The outer input's required properties are the Cartesian product's required properties; for the inner input, protection even under rewinding is required (rewind flag is on).

Nested loops join: Like Cartesian product, but rebinds its inner input with a new parameter value for each item in the outer input. Required and delivered Halloween properties are derived like Cartesian product. The difference between rewinding and rebinding the inner input is captured by the unbound parameters in the inner input.

Summary

The methods, structure and data structures of the present invention provide an efficient method for preventing Halloween problem conflicts. Halloween protection is provided in the update plan by considering various other operators in addition to the eager spool operator and at locations anywhere in an update plan not just on the input side of an update operator. The Halloween protection system of the present invention provides improved update efficiency by interleaving the search and update phases to the full extent possible while still maintaining the required semantics, i.e., the search then update semantics of set-at-a-time pipelining, in the update plan. Thus record-at-a-time pipelining is used as much as possible by the query optimizer of the present invention and operators providing set-at-a-time semantics are used to provide Halloween protection. The Halloween property is used alongside the existing system of required and delivered plan properties to aid in the administration of the system of the present invention.

It is to be expressly understood that the claimed invention is not to be limited to the description of the above embodiments but encompasses other modifications and alterations within the scope and spirit of the inventive concept.

We claim:

1. A method for preventing Halloween problem conflicts when updating records in a database system, comprising the steps of:

receiving an update query from a user of said database system wherein said update query defines a desired result of an update of said records in said database system;

determining, responsive to receipt of said update query, whether Halloween protection is necessary in an update plan for executing said update query;

generating, responsive to said determining step, said update plan where said update plan is a group operators with at least one operator of said group of operators being an update operator and where Halloween protection is provided for at least one column of at least one record source by at least one Halloween protection operator which produces output for which said update operator is not a direct consumer; and processing said records with said update plan to provide output records satisfying said update query wherein said records are free from Halloween problem conflicts.

2. The method of claim 1 wherein said determining step includes:

determining if said at least one record source is to be both searched and updated responsive to said update query.

3. The method of claim 1 wherein said determining step includes:

determining if consistency of physically forwarded records must be maintained responsive to said update query.

4. The method of claim 1 where said determining step includes:

determining if execution of said update query involved searching an index sorted by a search key.

5. The method of claim 1 wherein said generating step includes:

maintaining a Halloween property system for indicating what type of Halloween protection is necessary with respect to each operator of said group of operators; and selecting as one of said group of operators at least one Halloween protection operator from among a group of Halloween protection operators.

6. The method of claim 5 wherein said selecting step includes:

selecting said Halloween protection operator from among a group of stop-and-go operators where each member of said group of stop-and-go operators consumes all input records prior to outputting a first output record.

7. The method of claim 5 wherein said selecting step includes:

selecting said Halloween protection operator from among a group of stop-and-go operators wherein said group of stop-and-go operators includes full sort, hash distinct, hash aggregation, Grace hash join and hybrid hash join.

8. The method of claim 5 wherein said selecting step includes:

selecting said Halloween protection operator where said selected Halloween operator is a top operator.

9. The method of claim 5 wherein said selecting step includes:

selecting said Halloween protection operator from a among a group of flow distinct operators where each member of said group of flow distinct operators ensures uniqueness of said records processed by said flow distinct operator.

10. The method of claim 5 wherein said selecting step includes:

selecting said Halloween protection operator from a among a group of operators comprised of hash flow distinct and major-minor sort.

11. The method of claim 5 wherein said generating step further includes:

selecting as remaining ones of said group of operators additional operators necessary to satisfy said query request; and building said update plan from said at least one selected Halloween protection operator and said additional operators wherein said update plan is comprised of group of operators.

12. The method of claim 11 wherein said building step includes:

placing said selected Halloween protection operator in said update plan so that Halloween protection is provided for at least one column of any said records output from said selected Halloween protection operator.

13. The method of claim 5 wherein said step of maintaining a Halloween property system includes:

deriving a required Halloween property for one operator of said group of operators that defines the type of Halloween protection required for said records input to said one operator; and deriving a delivered Halloween property for said one operator that defines the type of Halloween protection delivered for said records output from said one operator.

14. The method of claim 13 wherein said step of deriving a required Halloween property includes:

identifying a input table and at least one input column of said searched table, responsive to determining the necessity of Halloween protection;

deriving a required level of Halloween protection for said input table and said input column; and combining an identifier for said input table and an identifier for said input column and an identifier for said required level of Halloween protection to form said required Halloween property.

15. The method of claim 13 wherein said step of deriving a delivered Halloween property includes:

identifying an output table and at least one output column of said output table, responsive to determining the necessity of Halloween protection, for which Halloween protection is not provided by said one operator;

deriving a delivered level of Halloween protection for said output table and said output column wherein said delivered level is indicative of the level of Halloween protection still required to provide Halloween protection for said output table and said output column; and combining an identifier for said output table and an identifier for said output column and identifier for said delivered level of Halloween protection to form said delivered Halloween property.

16. The method of claim 1 wherein said generating step includes:

generating an update plan wherein said update operator is a delete operator.

17. The method of claim 1 wherein said generating step includes:

generating an update plan wherein said record source is a table.

18. A method for preventing Halloween problem conflicts when updating records in a database system, comprising the steps of:

receiving an update query from a user of said database system wherein said update query defines a desired result of an update of said records in said database system;

determining, responsive to receipt of said update query, whether Halloween protection is necessary in an update plan for executing said update query;

generating, responsive to said determining step, at least two possible update plans where each said possible update plan is a group operators where Halloween protection is provided for at least one column of at least one record source by at least one Halloween protection operator;

selecting from among said possible update plans the most efficient one of said possible update plans; and processing said records with said selected update plan to provide output records satisfying said update query wherein said records are free from Halloween problem conflicts.

19. The method of claim 18 wherein said determining step includes:

determining if said at least one record source is to be both searched and updated responsive to said update query.

20. The method of claim 18 wherein said determining step includes:

determining if consistency of physically forwarded records must be maintained responsive to said update query.

21. The method of claim 18 wherein said determining step includes:

determining if execution of said update query involves both searching and updating a multi-column index.

22. The method of claim 18 where said determining step includes:

determining if execution of said update query involved searching an index sorted by a search key.

23. The method of claim 18 wherein said generating step includes:

generating said update plan where said update plan is organized a tree of operators.

24. The method of claim 18 wherein said generating step includes:

generating said update plan where said update plan is organized as an acyclic directed graph.

25. The method of claim 18 wherein said generating step includes:

maintaining a Halloween property system for indicating what type of Halloween protection is necessary with respect to each operator of said group of operators; and selecting as one of said group of operators at least one Halloween protection operator from among a group of Halloween protection operators.

26. The method of claim 25 wherein said step of selecting at least one Halloween protection operator includes:

selecting said Halloween protection operator from among a group of stop-and-go operators where each member of said group of stop-and-go operators consumes all input records prior to outputting a first output record.

27. The method of claim 25 wherein said step of selecting at least one Halloween protection operator includes:

selecting said Halloween protection operator from among a group of stop-and-go operators wherein said group of stop-and-go operators includes full sort, hash distinct, hash aggregation, Grace hash join and hybrid hash join.

28. The method of claim 25 wherein said step of selecting at least one Halloween protection operator includes:

selecting said Halloween protection operator where said selected Halloween operator is a top operator.

29. The method of claim 25 wherein said step of selecting at least one Halloween protection operator includes:

selecting said Halloween protection operator from a among a group of flow distinct operators where each member of said group of flow distinct operators ensures uniqueness of said records processed by said flow distinct operator.

30. The method of claim 25 wherein said step of selecting at least one Halloween protection operator includes:

selecting said Halloween protection operator from a among a group of operators comprised of hash flow distinct and major-minor sort.

31. The method of claim 25 wherein said generating step further includes:

selecting as remaining ones of said group of operators additional operators necessary to satisfy said query request; and building said update plan from said at least one selected Halloween protection operator and said additional operators wherein said update plan is comprised of group of operators.

32. The method of claim 31 wherein said building step includes:

placing said selected Halloween protection operator in said update plan so that Halloween protection is provided for at least one column of any said records output from said selected Halloween protection operator.

33. The method of claim 25 wherein said step of maintaining a Halloween property system includes:

deriving a required Halloween property for one operator of said group of operators that defines the type of Halloween protection required for said records input to said one operator; and deriving a delivered Halloween property for said one operator that defines the type of Halloween protection delivered for said records output from said one operator.

34. The method of claim 33 wherein said step of deriving a required Halloween property includes:

identifying a input table and at least one input column of said searched table, responsive to determining the necessity of Halloween protection;

deriving a required level of Halloween protection for said input table and said input column; and combining an identifier for said input table and an identifier for said input column and an identifier for said required level of Halloween protection to form said required Halloween property.

35. The method of claim 33 wherein said step of deriving a delivered Halloween property includes:

identifying an output table and at least one output column of said output table, responsive to determining the necessity of Halloween protection, for which Halloween protection is not provided by said one operator;

deriving a delivered level of Halloween protection for said output table and said output column wherein said delivered level is indicative of the level of Halloween protection still required to provide Halloween protection for said output table and said output column; and combining an identifier for said output table and an identifier for said output column and identifier for said delivered level of Halloween protection to form said delivered Halloween property.

36. The method of claim 18 wherein said generating step includes:

maintaining a Halloween property system for indicating what type of Halloween protection is necessary with respect to each operator of said group of operators; and determining, for each operator, what level of Halloween protection is necessary.

37. The method of claim 30 wherein said generating step further includes:

selecting no additional operators in response to determining that no Halloween protection is required.

38. The method of claim 18 wherein said generating step includes:

generating an update plan wherein said update operator is an insert operator.

39. The method of claim 18 wherein said generating step includes:

generating an update plan wherein said update operator is a delete operator.

40. A computer-readable medium having computer-executable components comprising:

(a) a query receipt component for receiving an update query from a user;

(b) a problem determination component for determining if execution of said update request received by said query receipt component requires Halloween protection;

(c) a Halloween property maintenance component for maintaining a system of required and delivered Halloween properties;

(d) a query optimizer component for generating an update plan comprised of a group of operators for executing said update request; and (e) if it is determined that Halloween protection is necessary;

(i) selecting at least one Halloween protection operator for inclusion in said update plan to ensure that Halloween protection is provided for records updated by said update plan.

41. The computer-readable medium of claim 40 wherein said query optimizer comprises:

a Halloween operator selection component for selecting said Halloween protection operator from among a group of operators capable of providing a level of Halloween protection.

42. The computer-readable medium of claim 41 wherein said building component comprises:

a placement component for locating said selected Halloween protection operator in said update plan so that Halloween protection is ensured for records output from said update plan.

43. The computer-readable medium of claim 40 wherein said query optimizer comprises:

a Halloween operator selection component for selecting said Halloween protection operator from among a group of operators including stop-and-go operators and flow distinct operators.

44. The computer-readable medium of claim 40 wherein said query optimizer comprises a building component for building said update plan from said at least one selected Halloween protection operator and additional operators wherein said update plan is comprised of said group of operators and effectively executes said update query.

45. The computer-readable medium of claim 40 wherein said Halloween protection component comprises:

a required Halloween property component for deriving a required Halloween property that defines the type of Halloween protection required for a record input to one of said group of operators.

46. The computer-readable medium of claim 40 wherein said Halloween protection component comprises:

a delivered Halloween property component for deriving a delivered Halloween property that defines the extent to which Halloween protection is provided for a record output from one of said group of operators.

47. The computer-readable medium of claim 40 having further computer-executable components comprising:

an update plan selection component for selecting a preferred update plan from multiple possible update plans generated by said query optimizer component.

48. The computer-readable medium of claim 47 wherein said update plan selection component comprises:

an efficiency determination component for determining the efficiency of each of said possible update plans; and a selection component for selecting the most efficient one of said possible update plans as an execution plan.

49. The computer-readable medium of claim 47 wherein said query optimizer comprises:

a Halloween operator selection component for selecting said Halloween protection operator from among a group of operators capable of providing a level of Halloween protection.

50. The computer-readable medium of claim 47 wherein said query optimizer comprises:

a Halloween operator selection component for selecting said Halloween protection operator from among a group of operators including stop-and-go operators and flow distinct operators.

51. The computer-readable medium of claim 47 wherein said query optimizer comprises a building component for building said update plan from said at least one selected Halloween protection operator and additional operators wherein said update plan is comprised of said group of operators and effectively executes said update query.

52. The computer-readable medium of claim 51 wherein said building component comprises:

a placement component for locating said selected Halloween protection operator in said update plan so that Halloween protection is ensured for records output from said update plan.

53. The computer-readable medium of claim 47 wherein said Halloween protection component comprises:

a required Halloween property component for deriving a required Halloween property that defines the type of Halloween protection required for a record input to one of said group of operators.

54. The computer-readable medium of claim 47 wherein said Halloween protection component comprises:

a delivered Halloween property component for deriving a delivered Halloween property that defines the extent to which Halloween protection is provided for a record output from one of said group of operators.

* * * * *